United States Patent Office 2,772,139
Patented Nov. 27, 1956

2,772,139

METHOD OF PREPARING PHENOL DERIVATIVES OF WASTE SULPHITE LIQUOR, INCLUDING REMOVING THE CALCIUM IONS FROM THE WASTE LIQUOR

Harry B. Marshall, Toronto, Ontario, and Mary Curran, née Krizsan, Calgary, Alberta, Canada, assignors to Ontario Research Foundation, Toronto, Ontario, Canada No Drawing. Application February 13, 1956,
Serial No. 565,274

4 Claims. (Cl. 8—94.31)

This invention relates to a new and improved method for the preparation of phenol derivatives of waste sulphite liquor and is a continuation-in-part of our co-pending application, Serial No. 299,278, filed July 16, 1952.

The condensation of phenols with various forms of isolated lignin, or with lignin as it exists in the wood, is well known. The reaction takes place in the dry state in the presence of an acid catalyst, for example, hydrochloric acid, and at a temperature of 150° C. or higher. In addition, a process has been described in U. S. Patent No. 2,385,586, granted September 25, 1945, to H. Rudy et al. and entitled "Condensation of Phenols with Sulphite Waste Liquor," for the condensation of phenols with dried pulverized waste sulphite liquor solids in the presence of relatively high ratios of phosphoric acid (4–67% of the waste sulphite liquor solids) and under substantially anhydrous conditions.

These methods have the common disadvantage that they require dry powdered waste sulphite liquor solids and a substantially anhydrous reaction mixture. It is a well known fact of organic chemistry that condensations which proceed by the elimination of water are promoted by anhydrous reaction conditions. The surprising fact which we have discovered is that if the calcium ions in waste sulphite liquor are replaced by hydrogen ions, the condensation of waste sulphite liquor with phenol will proceed in aqueous solution. Since sulphite liquor as it comes from the mill is a dilute aqueous solution, containing in general 10 to 12% solids, the advantage of our process is apparent. In addition in our process, the lignin sulphonic acid is itself the catalyst for the condensation. This obviates the necessity of using strong mineral acid catalysts whose presence in the reaction product is undesirable and whose removal presents a serious problem.

The term waste sulphite liquor as used throughout this specification and claims is intended to mean calcium base waste sulphite liquor. Such a calcium base waste sulphite liquor results for example from the cooking of wood with calcium bisulphite and sulphurous acid. The term waste sulphite liquor is not intended to include magnesium, sodium or ammonium base waste sulphite liquors as we know of no practical method whereby the cations in such liquors may be precipitated out as is required according to the method of this invention hereinafter described in detail.

The calcium ions in such waste sulphite liquor may be replaced by hydrogen ions by a variety of processes such as by precipitaion with sulphuric acid, according to the equation:

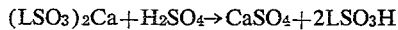

$$(LSO_3)_2Ca + H_2SO_4 \rightarrow CaSO_4 + 2LSO_3H$$

where $LSO_3$ signifies the legninsulphonate radical.

We have found that if the calcium ions are first removed, waste sulphite liquor will condense with phenols under relatively mild conditions, for example, even by refluxing a solution of the phenol in decalcified waste sulphite liquor for several hours. The condensation reaction has been found to depend upon a number of factors and in particular on time, temperatures, concentration and ratio of phenol to decalcified waste sulphite liquor solids. Thus, it is possible by suitable adjustment of the reaction conditions to obtain a wide variety of condensation products which differ with respect to the amount of phenol that is condensed with the waste sulphite liquor solids. It is also possible to vary the properties of the condensation product within wide limits by condensing waste sulphite liquor with other phenols such as cresol, catechol, resorcinol, hydroquinone, pyrogallol, β-naphthol, vanillin, salicylic acid, or by using mixtures of different phenols. The choice of these conditions and of the phenol will depend on the properties desired in the condensation product and thus upon the application for which it is to be used.

Our preferred conditions for carrying out this reaction are in the temperature range of 100–150° C. in a sealed acid-resisting autoclave equipped with a mechanical stirrer. The reaction may be carried out at lower temperatures but requires considerably longer reaction periods. At temperatures in excess of 150° C. the reaction proceeds very rapidly and is therefore more difficult to control.

Because of the large number of variables associated with this reaction, it is not possible to state precisely the time required to produce a condensation product with optimum properties for a specific application. This is most readily determined by experimentation and may vary from 30 minutes to 12 hours, depending upon the other conditions employed.

The concentration of the decalcified waste sulphite liquor is also a very important variable. It is apparent that prior evaporation of the waste sulphite liquor will increase the rate of reaction with the phenol and this must be taken into consideration when attempting to prepare a specific condensation product. Although the condensation reaction will take place over a wide range of concentrations of the decalcified waste sulphite liquor, we prefer to operate in the range of 10–50% solids by volume, 10% being the minimum concentration at which waste sulphite liquor is normally discharged from a sulphite mill, and 50% being the maximum concentration at which waste sulphite liquor solution can be readily stirred in the reactor.

The reaction between a phenol and decalcified waste sulphite liquor does not go to completion even under relatively severe reaction conditions. It is therefore necessary to use a somewhat higher ratio of phenol to decalcified waste sulphite liquor solids than that required in the final condensation product. The amount of excess phenol used is an important factor in determining the time necessary to obtain the required degree of phenolation (the number of grams of phenol condensed with 100 grams of waste sulphite liquor solids). It will be apparent that the amount of excess phenol may be varied over very wide limits, but we prefer to use an excess of not more than 200%. The presence of excess unreacted phenol in the condensation product is undesirable for most applications and may be readily removed and thus recovered for further use by extraction with a suitable organic solvent, or by high vacuum distillation of the residue obtained on evaporating the reaction product to dryness.

When hereafter and later in these specifications and the appended claims we refer to the heating of a compound with excess of a phenol it is to be understood that this term means compounds generally known in the art as simple phenols and specifically is intended to mean simple monohydric, dihydric or trihydric phenols or combinations thereof.

The degree of phenolation of the condensation product may be estimated from the difference between the amount of phenol added and the amount of phenol recovered. It may also be determined from the reduction in methoxyl content of the decalcified waste sulphite liquor during the condensation process.

It will be shown in subsequent examples that the degree of phenolation depends upon the extent to which the calcium ions are removed, and thus the properties of the ultimate condensation product will vary as the calcium ions are more or less removed. The present invention contemplates not only the complete removal of the calcium ions, but also their partial removal, the extent to which they are removed being dictated by such considerations as the desired properties of the condensation product, and such practical considerations as efficiency of removal of the calcium ions. Thus it is to be understood that when "removing the calcium ions" is specified elsewhere in this specification and in the appended claims, both complete and partial removal is contemplated and is to be understood. The calcium content calculated as CaO is suitably reduced so that the proportion of CaO to total solids in the waste sulphite liquor is less than 2.3 to 100.

We have found that the condensation products of decalcified waste sulphite liquor with various phenols are particularly satisfactory tanning agents. Waste sulphite liquor is used to a limited extent as an extender for the natural tannins, and as a bleaching and filling agent, but it cannot be considered a true tanning agent since, when used alone, it produces empty leathers with poor hydrothermal stability. We have found that these objections to waste sulphite liquor can be overcome if the waste sulphite liquor is first condensed with a phenol by our new process described above. These condensation products are true tanning agents since they produce soft, flexible leathers comparable in hydrothermal stability and yield to leathers prepared from the natural tannins. Thus, they may be used as tanning agents without supplementation with natural tannin extracts. Their properties may be varied within very wide limits by varying the amount of the phenol condensed with the waste sulphite liquor, by condensing waste sulphite liquor with mixtures of different phenols, or by using mixtures of different condensation products. They are also compatible with the natural tannins and if desired may be blended with them in various ways and in various amounts to produce a tanning agent with specific requirements. They have the additional advantage of being essentially ash-free and this advantage may be retained if ammonia is used to partially neutralize them to the pH required by the tanner.

In general, we have found that the tanning properties of these phenolic derivatives of decalcified waste sulphite liquor are improved in direct proportion to the amount of combined phenol, that is, in proportion to the degree of phenolation. However, as the degree of phenolation is increased, the condensation product becomes less soluble in water and eventually a point is reached at which insoluble colloidal particles begin to form. It is therefore desirable to interrupt the condensation reaction at this point since it represents the maximum degree of phenolation obtainable in a water soluble product. The presence of a small amount of colloidally dispersed material is not disadvantageous and in fact actually appears to improve the properties of the resulting leather. If this optimum reaction time is exceeded, insoluble condensation products are formed. These materials can be dissolved in other solvents, such as aqueous acetone, or they may be rendered soluble in water by sulphonation treatments, and such procedures are within the scope of this invention, but we prefer to prevent the formation of insoluble condensation products by suitable control of the reaction variables.

In general, the tanning properties of the phenolic condensates improve with increasing hydroxyl content of the phenol. However, for economic reasons, we prefer to use the condensate prepared by reacting phenol (mono-hydroxy benzene) with decalcified waste sulphite liquor. By continuing the condensation reaction to the point where a colloidal precipitate just begins to form, a highly satisfactory tanning agent can be prepared.

Waste byproduct phenols may also be used to advantage, for example, the crude phenolic mixture discarded from the caustic scrubbers of a petroleum refinery. This waste material consists essentially of mixed cresols and may be purified prior to condensation with decalcified waste sulphite liquor by any suitable method such as extraction with sodium bicarbonate or basic lead acetate solution and/or by distillation. The condensation products prepared from such materials have tanning properties comparable to those of the condensation product prepared from phenol.

The following description of experiments which have been performed by us will serve to illustrate the application of our invention. It is to be understood that our invention is not limited to the materials and conditions described in these experiments which are to be considered as examples only. If the presence of sugars in the condensation product is undesirable, they may be removed by fermentation or other treatments prior to the decalcification. The process is equally applicable to purified or precipitated fractions of lignin-sulphonates derived from waste sulphite liquor.

*Experiment 1.—Illustrating the effect of various degrees of decalcification of waste sulphite liquor on its condensation with phenol*

(a) To 12,000 ml. of calcium base fermented waste sulphite liquor, containing an equivalent of 0.49 g. calcium per 100 ml., was added 960 ml. of 10% sulphuric acid. The solution, which had a pH of 1.5, was decanted from the precipitated calcium sulphate, then concentrated under vacuum to about 25% solids and a second crop of calcium sulphate removed by filtration. The calcium sulphate removed by these treatments was equivalent to 71.2% of the calcium present in the original liquor. 3,600 ml. of the concentrated partially decalcified waste sulphite liquor, containing 917 g. of solids, was mixed with 917 g. of phenol, and heated for four hours at 125° C. in a glass lined autoclave fitted with a mechanical stirrer. The reaction mixture after removal of the excess phenol by solvent extraction was found to have a methoxyl content of 8.03% on an ash-free basis. Since the original waste sulphite liquor had a methoxyl content of 8.31%, on an ash-free solids basis, the degree of phenolation was calculated to be 3.5.

Two further experiments (b and c) were carried out in an identical manner but using larger ratios of sulphuric acid for precipitation of the calcium sulphate. The results of these experiments are summarized in Table I.

TABLE I

| Waste Sulphite Liquor, ml. | 10% Sulphuric Acid, ml. | Resultant pH | Percent Calcium Removed | Degree of Phenolation | |
|---|---|---|---|---|---|
| | | | | Calculated From Methoxyl | Calculated From Phenol Recovered |
| (a) 12,000 | 960 | 1.5 | 71.2 | 3.5 | |
| (b) 12,000 | 1420 | 1.25 | 82.8 | | 19.6 |
| (c) 12,000 | 1850 | 1.1 | 87.3 | 19.7 | 20.8 |

*Experiment 2.—Illustrating the tanning properties of condensation products of decalcified waste sulphite liquor with phenol*

Small pieces of pickled cow hide grain split (4" x 4") were de-pickled and brought to a pH of 4.7 using an acetate buffer solution. They were then tanned by the phenolic derivative of decalcified waste sulphite liquor, prepared as described in the Example 1(b) above, in the following manner. The hide sample was gently agitated for 24 hours in 125 ml. of a 2% tannin solution [1] which had been previously adjusted to a pH of 4.8 with sodium hydroxide. It was then transferred to a 100 ml. of a 3% tannin solution [1] which had previously been adjusted to a pH of 3.0 of sodium hydroxide, and agitated for a further 2 hours. The resulting leather was washed with water, pressed, weighed, then oiled and tacked firmly to a wooden board and allowed to dry slowly. The properties of this leather as well as those of leathers tanned with untreated waste sulphite liquor and quebracho are summarized in Table II.

TABLE II

| Tanning Material | Colour of Leather | Shrinkage Temperature, °C.* |
| --- | --- | --- |
| Decationized WSL | Light brown—uneven | 68 |
| Phenol-decalcified WSL condensate (Exp. 1b) | Medium brown | 76 |
| Quebracho | Medium reddish-brown | 82 |

*The original hide used in these experiments had a shrinkage temperature of 63° C.

These results show that the tanning properties of waste sulphite liquor are greatly improved by condensation with phenol in the manner described above.

What we claim is:

1. A process for the production of useful substances from calcium base waste sulphite liquor containing calcium lignin sulphonate compounds which consists of removing the calcium ions from the waste sulphite liquor by precipitation with sulphuric acid, heating the decalcified waste sulphite liquor to a temperature of between 100° C. and 150° C. with an excess of a phenol, said phenol being selected from the group consisting of monohydric, dihydric and trihydric phenols and combinations thereof, for a time sufficient to condense the lignin sulphonate compounds with said phenol, and removing the excess phenol.

2. A process for the production of useful substances from calcium lignin sulphonate compounds which consists of removing the calcium ions from the lignin sulphonate compounds by precipitation with sulphuric acid, heating the decalcified lignin sulphonate to a temperature of between 100° C. and 150° C. with an excess of a phenol, said phenol being selected from the group consisting of monohydric, dihydric and trihydric phenols and combinations thereof, for a time sufficient to condense the lignin sulphonate compounds with said phenol, and removing the excess phenol.

3. The process for the production of useful substances from calcium base waste sulphite liquor containing calcium lignin sulphonate compounds which consists of removing sufficient calcium ions from the waste sulphite liquor by precipitation with sulphuric acid that the proportion of calcium calculated as CaO to total solids is less than 2.3 to 100, heating the decalcified waste sulphite liquor to a temperature of between 100° C. and 150° C. with an excess of a phenol, said phenol being selected from the group consisting of monohydric, dihydric and trihydric phenols and combinations thereof, for a time sufficient to condense the lignin sulphonate compounds with said phenol, and removing the excess phenol.

4. The process for the production of useful substances from calcium lignin sulphonate compounds which consists of removing sufficient calcium ions from the lignin sulphonate by precipitation with sulphuric acid that the proportion of calcium calculated as CaO to total solids is less than 2.3 to 100, heating the decalcified lignin sulphonate to a temperature of between 100° C. to 150° C. with an excess of a phenol, said phenol being selected from the group consisting of monohydric, dihydric and trihydric phenols and combinations thereof, for a time sufficient to condense the lignin sulphonate compounds with said phenol, and removing the excess phenol.

References Cited in the file of this patent

UNITED STATES PATENTS

| 263,797 | Mitscherlich | Sept. 5, 1882 |
| 2,099,717 | Alles | Nov. 23, 1937 |

OTHER REFERENCES

Jour. Am. Leather Chemists Assoc., June 1949, pages 399–403 relied on.

---

[1] Based on the percentage tannins in the condensation product which were determined as the percentage absorbed by an excess of hide powder in 16 hours at room temperature.